United States Patent
Burke et al.

(10) Patent No.: US 6,604,681 B1
(45) Date of Patent: Aug. 12, 2003

(54) EVALUATIVE SHOPPING ASSISTANT SYSTEM

(75) Inventors: Raymond R. Burke, Bloomington, IN (US); Avanti Lalwani, Bloomington, IN (US); John Thong, Fishers, IN (US)

(73) Assignee: Advanced Research and Technology Institute, Inc., Indianapolis, IN (US)

( * ) Notice: Subject to any disclaimer, the term of this patent is extended or adjusted under 35 U.S.C. 154(b) by 0 days.

(21) Appl. No.: 09/574,825

(22) Filed: May 19, 2000

Related U.S. Application Data

(60) Provisional application No. 60/135,373, filed on May 21, 1999.

(51) Int. Cl.[7] .............................................. G06K 15/00
(52) U.S. Cl. ...................................... 235/383; 235/379
(58) Field of Search ................................. 235/379, 383, 235/380, 462.01, 462.13; 705/35–45

(56) References Cited

U.S. PATENT DOCUMENTS

| | | | |
|---|---|---|---|
| 5,287,266 A | 2/1994 | Malec et al. | 364/401 |
| 5,424,524 A | 6/1995 | Ruppert et al. | 235/462 |
| 5,687,322 A | 11/1997 | Deaton et al. | 395/214 |
| 5,848,399 A | 12/1998 | Burke | 705/27 |
| 5,890,135 A | 3/1999 | Powell | 705/14 |
| 5,898,383 A | 4/1999 | Forsythe | 340/825.35 |
| 5,979,757 A | 11/1999 | Tracy et al. | 235/383 |
| 5,995,942 A | 11/1999 | Smith et al. | 705/14 |
| 6,026,377 A | 2/2000 | Burke | 705/27 |
| 6,367,694 B1 * | 4/2002 | Roslak | 235/380 |

OTHER PUBLICATIONS

Web pages from www.wired.lycos.com—Wired News, Shopping by Bar Code No date.
Web pages from www.3.ibm.com—IBM Solutions No date.
Web pages from www.nytimes.com—The New York Times Technology Cybertimes e–commerce report No date.

* cited by examiner

Primary Examiner—Karl D. Frech
(74) Attorney, Agent, or Firm—Doreen J. Gridley; Ice Miller

(57) ABSTRACT

Evaluative shopping assistant system and method to provide the consumer with information about a product the consumer is interested in. The system includes a hand-held device having a bar code reader or other unique means of entering a product identifier, and a display mechanism. The hand-held device is connected via wired or wireless connection to a computer that is connected to a database of information. In use, the hand-held device reads the bar code, sends the bar code information to the computer, and the computer retrieves the appropriate information about the product from the database. The computer then sends the retrieved information to the hand-held device for display of the retrieved information. The information stored on the database may include information provided by the manufacturer, the retailer (or, more generally, seller), or consumers. When consumer information is provided, a consumer may view qualitative information, such as other consumer's opinions about the product, not normally provided by the manufacturer or seller. The system allows a seller to continuously collect marketing information about products and gives consumers a sense of community by allowing them to share information and opinions about products. In another embodiment, the database consists of generic information for location of the consumer or products by use of the product name or UPC number. In this manner, a consumer can, while shopping, easily find a product of interest and be directed to the product's location.

26 Claims, 9 Drawing Sheets

Online Shopping Site – PRIOR ART

Online Virtual Store – PRIOR ART

Touch-screen Kiosk (information/ordering version) – PRIOR ART

*Touch-screen Kiosk (promotion version) – PRIOR ART*

Self Checkout – PRIOR ART

*Self Scanning – PRIOR ART*

*Hand-held Shopping Assistant*

EVALUATIVE SHOPPING ASSISTANT SYSTEM

CROSS REFERENCE TO RELATED APPLICATIONS

This is a continuation-in-part of U.S. Provisional Patent Application No. 60/135,373, filed May 21, 1999.

FIELD OF THE INVENTION

This invention relates to electronic shopping aids, and in particular to a system to provide shoppers with consumer information.

BACKGROUND OF THE INVENTION

Various electronic systems are now provided for the convenience of shoppers. In recent years, developments in electronic commerce have removed shoppers from the confines of a retail store and the restrictions of mail order catalog shopping. By using multimedia techniques such as displaying product information, animation, 3D graphics, sound and video, consumers are free to shop in their own homes on their own time and without interference of a sales person who may have no knowledge of the products that the consumer is interested in. Systems offer flexibility not found in conventional shopping—the computer interface can facilitate or inhibit comparison shopping; encourage or discourage consumer interaction; make shopping fast and functional or slow and entertaining; and shopping can be directly controlled by the consumer or left to autonomous agents. Such systems include those described below:

The online shopping site, illustrated on the computer display of FIG. 1, is generally an electronic catalog that the consumer can access through the Internet. The online shopping site allows the consumer to purchase products sold by a conventional retail store from the convenience of the consumer's home or office. The consumer is able to shop at any hour of the day or night from a larger selection of products than could be carried in the store itself. To use the online shopping site, the consumer first turns on his/her computer and activates a web browser (such as Netscape's Navigator or Microsoft's Internet Explorer). The computer connects to the Internet through the consumer's phone line or a network connection. Then, the consumer just types in the Internet address (URL) of the retailer's web site.

The initial (home) page of the retailer's web site usually provides several shopping options. For example, the consumer is able to review product specials that are prominently featured on this page. The name, price, and a small picture of each item may be shown. If the consumer clicks his/her mouse on a featured item, the computer may then display a larger picture and more detailed information about the product. The information might include product specifications, operating instructions, usage suggestions and warranty information.

Often the consumer is able to search for specific products by selecting from a menu of product categories. The computer displays a list of the available products and their prices. If the list is longer than what will fit on the screen, the consumer can scroll through the items. By clicking on the name of an item, the consumer is sometimes given the ability to see a picture and a detailed description of the item. The consumer may also be able to search for a specific brand or type of product by typing its name into a text window. In response, the computer displays a list of the products that match. Again, the consumer can often click on an item for more detailed information.

To purchase an item, the consumer usually only need click on a button labeled "Add to shopping basket" or other similar label. When the consumer has finished shopping, the "Checkout" button or similar button can be clicked on to allow the consumer to then enter his/her name, address and payment information. The products in the shopping basket are usually shipped directly to the consumer's home (or other specified address) within the next one to three days depending on the delivery option the consumer selected.

The online virtual store, illustrated on the computer display of FIG. 2, is a virtual-reality simulation of a retail store that the consumer may access through the Internet. Like the online shopping site, the virtual store allows the consumer to purchase products sold by a conventional store from the convenience of the consumer's home or office. The consumer is able to shop at any hour of the day or night from a larger selection of products than could be carried in the store itself. To use the online shopping site, the consumer first turns on his/her computer and activates a web browser (such as Netscape's Navigator or Microsoft's Internet Explorer). The computer connects to the Internet through a phone line or a network connection. Then, the consumer just types in the Internet address (URL) of the retailer's web site.

The initial (home) page of the retailer's web site displays a store's floor plan, often viewed from above, laid out in the same manner as a conventional store. The various departments are labeled, with a special section dedicated to product specials and new items.

The consumer generally has several shopping options in the online virtual store. To select a specific store department and product category, the consumer clicks the mouse on the corresponding location on the store floor plan or selects its name from a menu. The consumer can usually also search for a specific brand or type of product by typing its name into a text window. In response, the computer displays a realistic, 3-D image of a store shelf stocked with a variety of products. The computer automatically highlights the names of any brands the consumer has specified. The products are arranged in the same way as in the conventional store. By pressing the controls on the computer keyboard, the consumer can pan across the shelf display and zoom in on specific items. By clicking on the image of a product, the consumer can pick up and rotate the package, examine it from any angle, and magnify the package labeling to read it. The label information might include product specifications, operating instructions, usage suggestions and warranty information.

To purchase a product, the consumer clicks on an image of a shopping cart and the product flies into the basket. When the consumer has finished shopping, the "Checkout" button is clicked allowing the consumer to enter his/her name, address and payment information. The product will be shipped directly to the consumer's home within the next few days depending on the delivery option the consumer has selected. Examples of the three-dimensional shopping systems are disclosed in U.S. Pat. Nos. 5,848,399 and 6,026,377.

The touch-screen kiosk is an easy-to-use computer and video display located in the retail store. An illustration of such a kiosk is shown in FIG. 3. In the embodiment of FIG. 3, the kiosk is used to provide shoppers with additional information about products throughout the store. The information might include product specifications, operating instructions, usage suggestions, and warranty information—facts the consumer normally may have to track down a salesperson and ask about to learn, or that can only be answered by wading through piles of printed materials after the consumer has bought the product.

The touch-screen kiosk also allows the consumer to view and purchase a wider selection of items than could be carried in the store itself, saving the consumer the time and aggravation of going from store to store to get exactly what the consumer wants. The touch-screen kiosk brings the advantages of electronic shopping to customers who do not have a home computer or access to the Internet.

During operation of the touch-screen kiosk, the consumer first touches the kiosk's display screen, and in response the screen shows a variety of different product categories. By touching the name or picture of a product category and subcategory, the computer displays a list of the available products and their prices, along with a small picture of each item and a flag indicating if it's available in the store or if it can be ordered from a central location. If the list is longer than what will fit on the screen, the consumer can scroll through the items. If the consumer touches the name of an item, the screen usually shows a larger picture and a detailed description of the item. The consumer is often given the ability to search for a specific brand or type of product by typing its name into a text window using an on-screen keyboard. In response, the computer displays a list of the products that match. Again, the consumer can usually touch the name of an item for more detailed information.

If the consumer is interested in purchasing an item, the button labeled "Add to shopping basket" can be touched. If an item is available in the store, the kiosk prints a map of the store and highlights the location of the item. If the item is ordered from a central location, the kiosk prints an order ticket with the product's name, description, picture, price and product code. The consumer can then take this ticket to a register to purchase the item. The product will be shipped directly to the consumer's home or available for pickup at the store within the next one to three days depending on the delivery option the consumer has selected.

In another embodiment, the touch-screen kiosk is an easy-to-use computer and video display located near the entrance of the retail store. When the consumer inserts a "frequent shopper" card into the kiosk, the kiosk displays a customized set of products and store specials based on the consumer's past purchases. This saves the consumer money on the things the consumer already knows he/she likes and reminds him/her of items he/she might want to stock up on. The featured products may be frequently purchased items that are now on promotion, or items that go with products that the consumer has purchased in the past. FIG. 4 shows an illustration of a kiosk used for promotion purposes. A kiosk system of this type is disclosed in U.S. Pat. No. 5,995,942. An alternate embodiment of the kiosk is disclosed in U.S. Pat. No. 5,890,135.

The operation of a kiosk for frequent shoppers follows. First, if the consumer does not already have a frequent shopper card, the consumer generally needs to pick one up from the store's customer service desk. Once the consumer has his/her card, it is inserted into a card reader on the front of the kiosk. The computer screen displays how much money the consumer can save during the day's shopping trip. When the consumer touches the screen, the kiosk shows the name, price, and picture of each item that is on promotion. The consumer can usually flip between several screens of offers, including discounts, free samples, recipes, and the chance to enter sweepstakes. To accept an item, the consumer simply touches its name or picture on the screen. At the end of the session, the kiosk prints out a personal shopping list, with the recipes and coupons for any items the consumer has selected. This saves the consumer the trouble of having to clip out store coupons.

When the consumer presents his/her frequent shopper card at the checkout counter, the system automatically deducts the electronic coupons from the order. The kiosk and checkout registers are linked, so the consumer doesn't need to double-check the cashier to make sure his/her coupons are being subtracted.

The self-checkout system, an illustration of which is shown in FIG. 5, usually consists of an automated teller machine (ATM), barcode scanner, weighing scale and checkstand located in a special, express-checkout lane of the retail store. It allows the consumer to scan his/her own purchases quickly and conveniently, pay with cash, credit card or debit card, and bag the products, all without the assistance of a cashier. The self-checkout system allows the consumer to avoid long checkout lines. The consumer is able to move at his/her own pace and check the price of each item, so he/she is sure it's done properly.

During operation, when the consumer has finished his/her shopping and is ready to check out, the purchases are taken to the self-checkout station. A video monitor provides the consumer with step-by-step instructions on how to scan and pay for the purchases. First, the consumer passes each item across a scanning device that shows the product's name and price on an electronic display. The consumer then places each item into a shopping bag. When the consumer has scanned all of the items, the computer asks the consumer to indicate his/her method of payment. If the payment method is cash, the consumer inserts bills and/or coins into the machine, which returns change if necessary. If the consumer opts to pay with a credit or debit card, the consumer inserts the card into a slot and waits for his/her receipt. A cashier is stationed near the self-checkout to answer questions and assist with coupons, checks, food stamps and gift certificates. The cashier may also weigh items without bar codes and scan items that are too large to place on the scanner. As a security check, the self-checkout system usually has an overhead surveillance camera to confirm that each item is scanned first before being placed in the bag.

The "self-scanning system", such as that illustrated in FIG. 6, is a hand-held, product barcode reader, similar in size and shape to a telephone handset, which the consumer can use to scan and tally his/her purchases while he/she is shopping. The self-scanner lets the consumer move through the store at his/her own pace and check the price of each item on its liquid-crystal display (LCD) screen, so the consumer is sure it matches the price shown on the shelf. When the consumer has finished shopping, the scanner prints out a ticket that the consumer takes to an express checkout counter and pays for his/her order. The self-scanning system lets the consumer avoid long checkout lines, so the consumer can complete his/her shopping faster.

During operation of the self-scanning system, when the consumer enters the store, the consumer uses a store-issued identification card to obtain a hand-held scanner from a dispenser rack. The self-scanner can be carried in the consumer's hand or slipped into a special holder on the shopping cart. To scan an item, the consumer simply holds the product's package or tag in front of the scanner's barcode reader so it can record the product code. The scanner has three keys. The "plus" key records a purchase, the "minus" key deletes a purchase, and the "equals" key totals all of the items recorded so far. Because the self-scanner keeps a running total of all purchases, there's no need for the consumer to keep a rough total of how much he/she is spending in his/her head. Therefore, he/she won't be surprised by his/her bill when he/she reaches the cash register.

When the consumer has finished shopping, the consumer simply returns the scanner to a rack and a computer will automatically print a bar-coded ticket. The consumer then takes the ticket and his/her basket of products to an express checkout station where the cashier scans the ticket and accepts any coupons. The consumer pays as usual, receives his/her receipt, and is on his/her way.

The above systems generally assist shoppers by providing different media through which the shopper can select an item (such as with the online shopping site, the online virtual store, the online shopping assistant, and the touch-screen kiosks described above), or provide a vehicle for expediting checkout in a store that uses a bar code system to identify the prices of the items it carries (such as the self checkout and self scanning systems described above). These systems may assist the retailer to identify quantitative information about its merchandise, and general information about consumers' interests in its products (either in total, by product type, or by specific product). There are generally limitations, however, with regard to the provision of qualitative information about the products. Therefore, it is desired to provide an electronic commerce system that provides the retailer with qualitative information, as viewed by the consumer, about the retailer's products.

For those systems that present information to the consumer about the product, the consumer only receives information the retailer desires to provide. This means that the consumer is at the mercy of the retailer to accurately describe its own products and to identify the shortcomings of any particular product. Although it is not impossible, it is unlikely that the retailer will identify anything negative or critical of its own products. Therefore, it is desired to develop an informative system for use in everyday consumer transactions that provides the consumer with qualitative information about the products it is interested in consuming.

Another issue not yet addressed with current shopping systems used in retail stores involves provision of information about either location of an item in the store or location of the consumer in the store. The introduction of warehouse type stores and superstores has made shopping a confusing, athletic endeavor. If the consumer does not know where an item is located, he/she may needlessly traverse many aisles. Also, the consumer may not know what route to use to make his/her purchases. Further, even if the consumer is familiar with the store's layout, when the store's shelves are reorganized, the consumer may be at a loss to find the product desired.

As previously mentioned, the touch-screen kiosk placed at the entrance of the store may print a map of the store and highlight the location of an item selected. Although such a system is useful, its lack of portability presents impracticality in its use. Consider, for example, that consumer may only remember an item to be purchased once inside the store among its aisles. The entrance-located kiosk is not very helpful to the consumer in such instance. Further, the kiosk does not direct the consumer to the next item to be purchased. If the consumer had sought the location of several items at the entrance-located kiosk, the consumer must navigate using the several maps printed by the kiosk.

U.S. Pat. No. 5,287,266, discloses a system for shopping carts which is capable of determining the cart's position in a store. The system includes a plurality of trigger transmitters located throughout the store in known zones and an electronic device connected to the shopping cart which is able to receive trigger signals from the transmitters. When the cart's electronic device receives a sufficient trigger from a trigger transmitter, the location of the cart is known to be within the zone of the appropriate transmitter. The location of the shopper is limited to the zones covered by the transmitters, and is not tied to specific product location.

Therefore, it is desirable to provide a location system which is portable, and which can provide the consumer with specific directions to the locations of specific products while the consumer is shopping.

SUMMARY OF THE INVENTION

The present invention is a system and method to aid a shopper by providing qualitative product information or product location information to the shopper during his/her shopping experience. Generally, the system comprises a portable device, a processor, and a database. The portable device is sized to permit the shopper to have the device with him/her while shopping. The device may be a hand-held computer, cellular telephone, telephone, personal digital assistant, or other hand-held or operable computing and communication device. The portable device may also comprise a device attached to the shopping cart or basket used by the shopper. The portable device includes a means for communication information to the shopper, either by text, graphics, audio or other mechanisms comprehensible by the shopper.

The system also includes a processor remote to the portable device. The processor is capable of bi-directional communication with the portable device. This bi-directional communication maybe achieved by wired or wireless means. If the communication is wireless, both the portable device and the processor need a transmitter and receiver for exchange of information between the portable device and processor.

The third element of the system of the present invention is a data storage means having a database thereon. The data storage means may comprise disk, hard disk, CD-ROM, ROM, DVD, magnetic tape, or any other data storage device known in the art. The data storage means is in connection with the processor. Such connection may be direct (such as when a hard disk is housed within the same housing as the processor), or remote (such as when the database resides on a server on the Internet).

Two types of databases are disclosed and considered to be part of the present invention. In one embodiment, the database comprises unique product identifiers for products offered by the store, and, for each unique product identifier, qualitative product data for the product represented by the product identifier. The qualitative information may include product specifications, operating instructions, usage suggestions, warranty information, or consumer commentary, for example. The availability of such qualitative information to the shopper enhances the shopping experience and provides a vehicle for the retailer or manufacturer to obtain marketing information about the market for its products.

Another type of database within the scope of the present invention relates location information to the unique product identifiers. In one embodiment, the database contains two types of planogram files. One file contains geometric data (spatial data) regarding the location of aisles within the store. The second file contains geometric data regarding the shelf-aisle location of each product residing within the store.

Use of the geometric (spatial) data allows the shopper to determine the location of any product within the store, and, if a recent location of the shopper is known, directions can be given to the shopper to find the desired product.

During operation of the system of the present invention, the shopper enters a product identifier into the portable device. The entered product identifier is transmitted by the portable device to the processor. The processor retrieves the database information corresponding to the entered product identifier and then transmits the retrieved database information to the portable device. Finally, the portable device communicates the retrieved database information to the shopper.

In one embodiment, the unique product identifier comprises the Universal Product Code (UPC) of the product. In such embodiment, the portable device of the invention may include a laser or video scanner, although entry by other means (keyboard, handwriting pad, voice recognition, etc.) is acceptable. In another embodiment, the shopper may enter the product name. The product name may be as broad or narrow as desired. For example, the system could accept the entry of "toilet paper," "Charmin®," "Charmin®, double roll," or "Charmin®, double roll, 8-pack," for example.

DETAILED DESCRIPTION OF THE INVENTION

The present invention comprises a shopping assistant system and method, as described herein, that can be used by the consumer to obtain qualitative information, as viewed by other consumers, about the product(s) he/she is interested in purchasing as well as factual information about the product(s). In addition, the present invention is capable of determining the consumer's location in the store and the location of products desired by the consumer.

Figure 1:
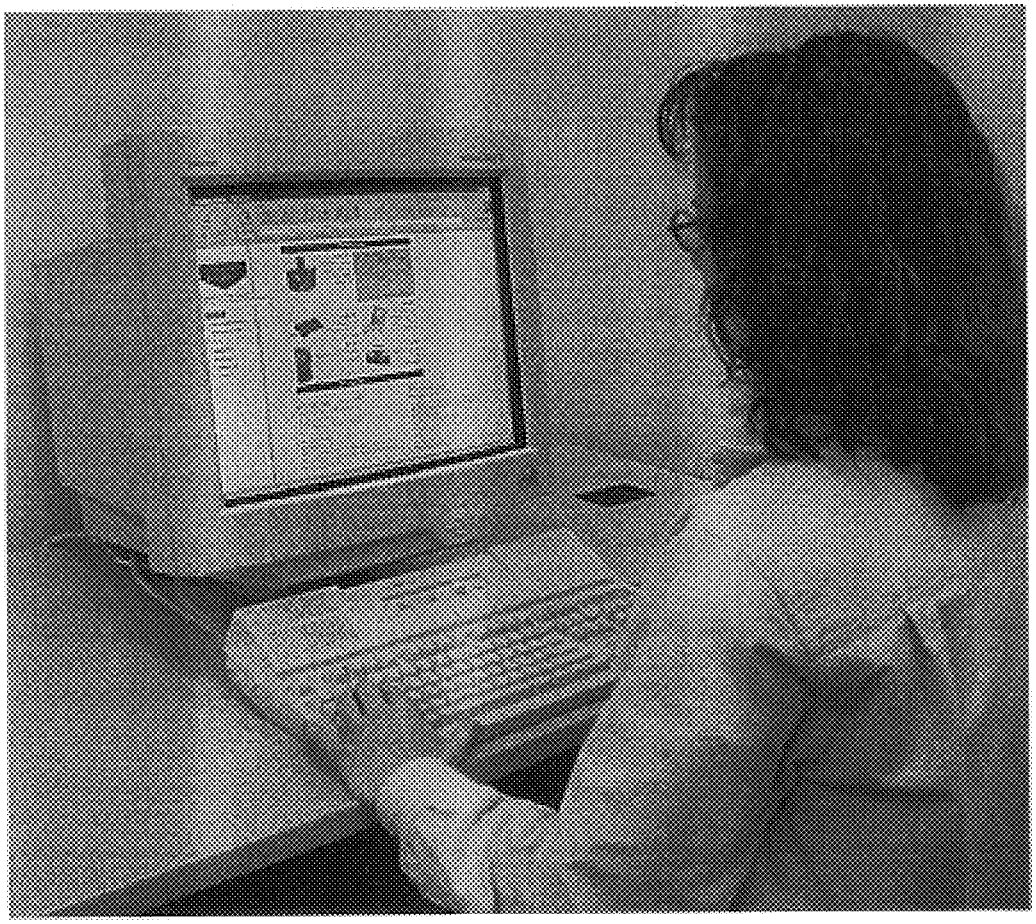
FIG. 1 shows a pictorial view of a computer displaying an online shopping site that constitutes prior art to the present invention.
Figure 2:
FIG. 2 shows a pictorial view of a computer displaying an online virtual store that constitutes prior art to the present invention.
Figure 3:
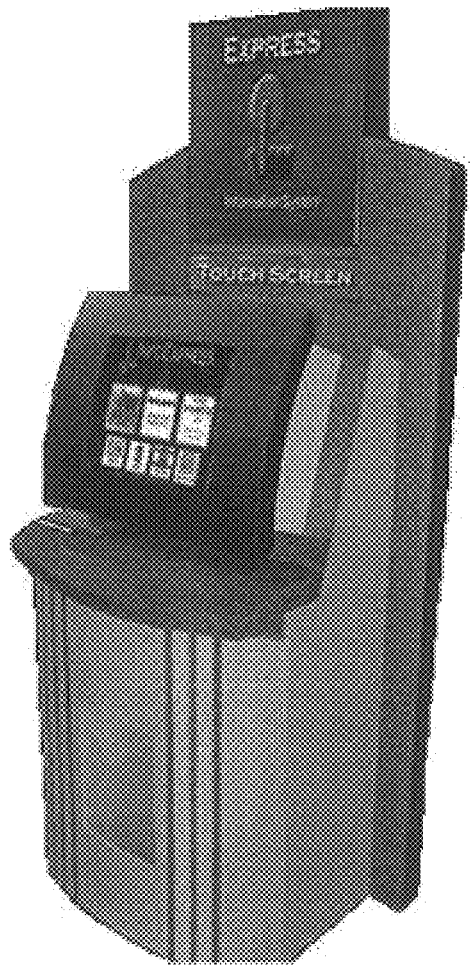
FIG. 3 shows a pictorial view of a touch-screen kiosk used for information and ordering, and which constitutes prior art to the present invention.
Figure 4:
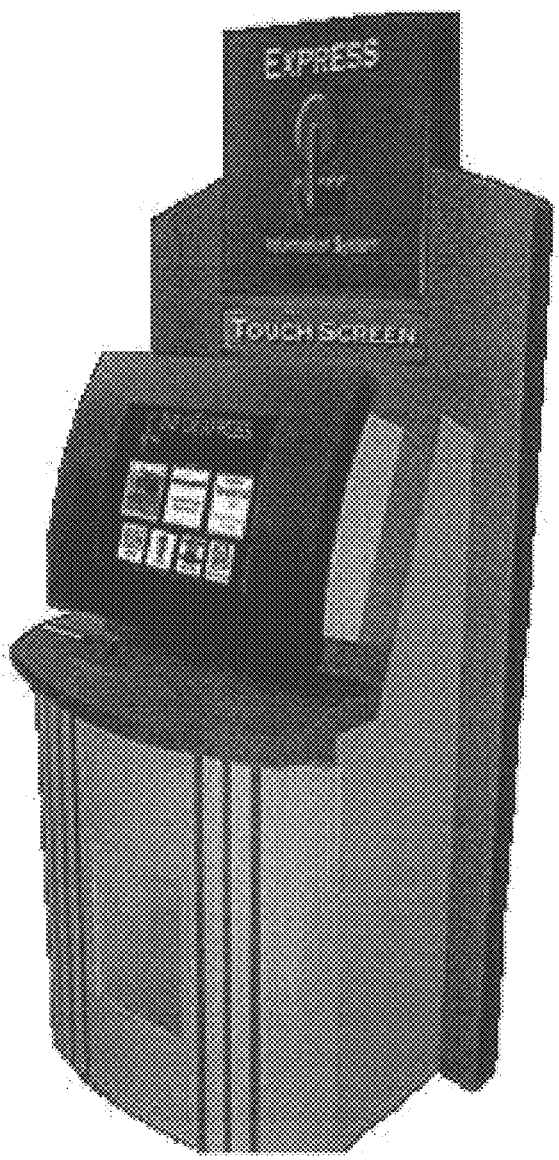
FIG. 4 shows a pictorial view of a touch-screen kiosk used for promotions that constitutes prior art to the present invention.
Figure 5:
FIG. 5 shows a pictorial view of a self-checkout station that constitutes prior art to the present invention.
Figure 6:
FIG. 6 shows a pictorial view of a self-scanner that constitutes prior art to the present invention.
Figure 7:
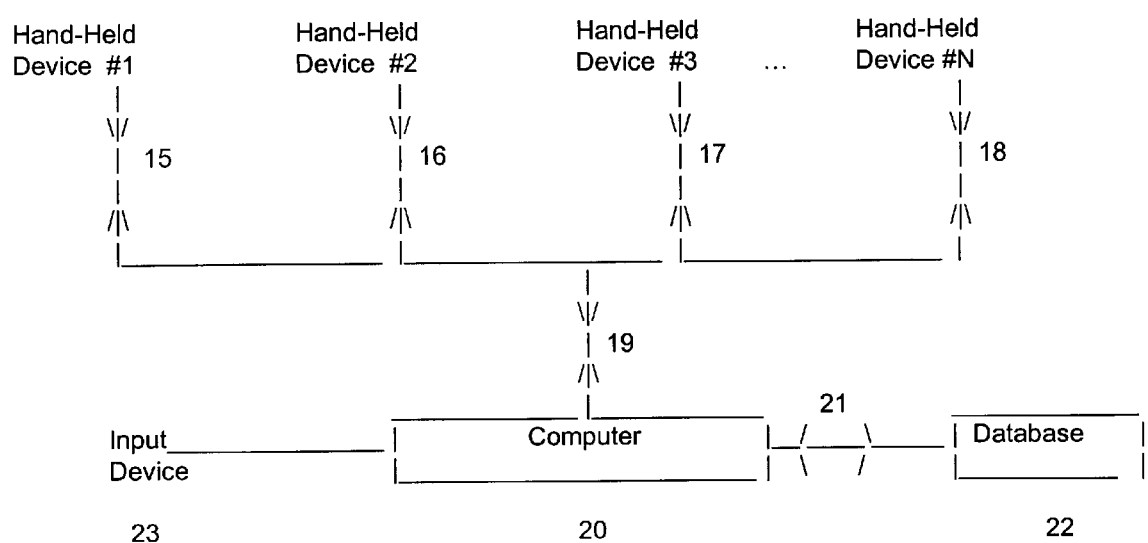
FIG. 7 shows a block diagram of one embodiment of the shopping assistant system according to the present invention.

Referring now to FIG. 7, there is shown a block diagram of one embodiment of the shopping assistant system according to the present invention. In this embodiment, the system comprises at least one hand-held device as is described in greater detail herein. Each of the at least one hand-held devices is "connected" to computer 20 which is, in turn, connected to database 22. In the embodiment of FIG. 7, hand-held devices 1, 2, 3 and N are connected by bi-directional connectors 15, 16, 17 and 18, respectively. Connectors 15, 16, 17 and 18 may comprise infrared communications mechanisms or other wireless communications mechanisms as are well known in the art, to permit hand-held devices 1, 2, 3 and N to be hand-carried by the consumer about the store. It is possible that connectors could be wires, fiber optic cables, or non-wireless communications mechanisms if it is desired to have the hand-held devices remain within a restricted area. Such wired connectors may be desired if the system is only to be used to provide the consumer with information about a limited number of products located in close proximity to each other.

The system of the present invention also includes bi-directional computer connection 19 that serves to connect connectors 15, 16, 17 and 18 to computer 20. Computer connection 19 may comprise a network (wired or wireless) as is well known in the art. In communication with computer 20 via database connector 21 is database 22. Database connector 21 may comprise, for example, an internal connector housed within computer 20 if, for example, database 22 resides on a hard disk within the computer. If database 22 is external to the housing of computer 20, then database connector 21 may be wired or wireless as is well known in the art. For example, database 22 may reside on a hard disk, optical disc, or server connected to computer 20 by a network, including but not limited to the Internet, a local area network, or a wide area network.

The system further comprises input device 23 for input of information into database 22. Input device 23 may comprise, for example, a keyboard, touch pad, voice recognition system, or other input device capable of receiving textual information and communicating such information to computer 20 for placement into database 22 in an organized manner as is well known in the art. As is described in greater detail herein, input device 23 need not be a device separate from the hand-held device if the hand-held device is provided with a means for providing textual information to computer 20.

It will be appreciated by those of skill in the art that computer connector 19 need not be structurally separate from connectors 15, 16, 17 and/or 18. It is within the scope of the invention for connectors 15, 16, 17 and 18 to connect directly (by wired or wireless means) to computer 20.

Figure 8:
FIG. 8 shows a pictorial view of one embodiment of the hand-held device used with the shopping assistant system and method of the present invention.
Figure 9:
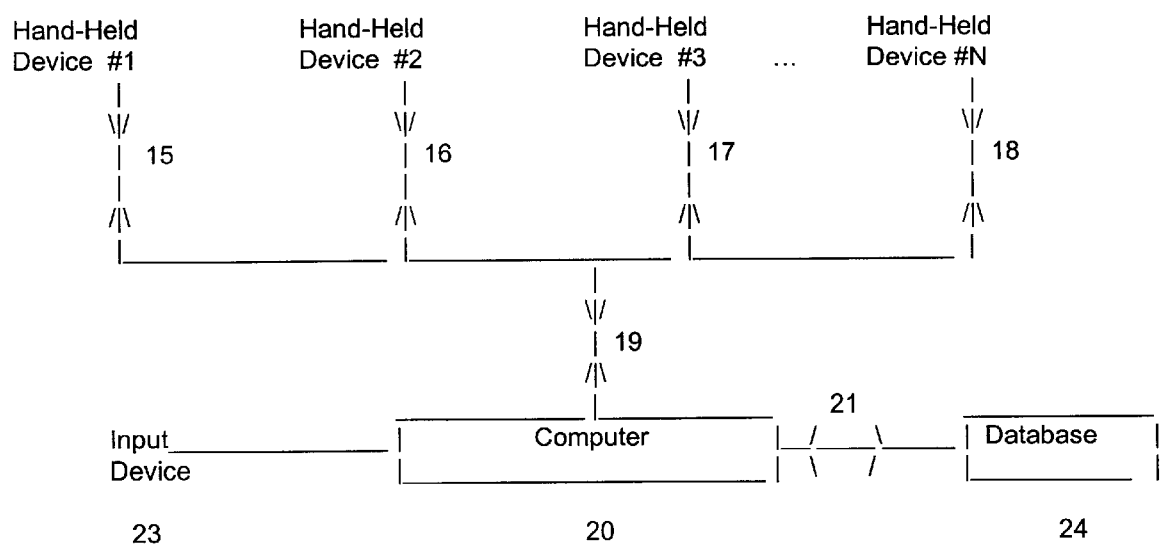
FIG. 9 shows a block diagram of another embodiment of the shopping assistant system according to the present invention in which the location of the consumer or of a product in the store can be located.

One embodiment of the "hand-held shopping assistant" device, for example, comprises a light-weight, palm-size device with a touch-sensitive, liquid-crystal display (LCD) screen and a product barcode reader as is illustrated in FIG. 8. Alternatively, the hand-held devices may comprise a computer, a telephone, personal digital assistant, or device connected to the shopper's cart or basket. The hand-held device of FIG. 9 provides shoppers with additional information about products throughout the store. The information might include product specifications, operating instructions, usage suggestions, and warranty information—facts the consumer normally has to track down a salesperson and ask about to learn, or that can only be answered by wading through piles of printed materials after the consumer buys the product. In addition, such information may include consumer comments about the specific product—one or more consumer's view of the features, functions, price, maintenance, or other qualitative descriptions of the product.

Such information is stored in database 22 and is referred to generally herein as qualitative data.

During operation, after the consumer enters the store, the consumer uses a store-issued identification card to obtain a hand-held device from a dispenser rack. The hand-held device can be carried in the consumer's hand or slipped into a special holder on the shopping cart. To use the hand-held device, the consumer simply holds the scanner's barcode reader of the device up to the package, product tag or shelf tag of the product the consumer wants to evaluate. Referring once again to FIG. 7, the hand-held device identifies the product code by the bar code reader, connects to computer 20 (via the appropriate connector 15, 16, 17 or 18 and via computer connector 19). Computer 20 then retrieves (over database connector 21) information from database 22, and then sends the retrieved information to the shopping assistant. The hand-held device then displays the retrieved product information on its LCD screen.

Information must initially be stored in database 22. Such storage can be achieved by input device 23. Alternatively, if the hand-held device comprises an input device, a consumer could enter the information directly from the hand-held device. Consumer entered information might include his/her opinion about the product or experiences therewith that may be of value to another consumer. Consumer information may also include a comment about the product for retrieval by that consumer when it returns to the store to buy that same item.

It will be appreciated by those of skill in the art that the seller can enter information into database 22. Such information may include information about the product from the manufacturer, or special prices offered by the seller. Also, information may be provided directly by the manufacturer, such as for product specifications, or the database may actually comprise a database belonging to the manufacturer. Further, if the hand-held device comprises selection means, such as the keys illustrated on FIG. 8, that the consumer could select the type of information he/she wishes to view about the scanned product. Selections may be presented on the display of the hand-held device for this purpose. Such selection information would need to be communicated to computer 20 in addition to the bar code information for retrieval of the corresponding selected information from database 22.

It will also be appreciated that the present invention allows a seller and/or manufacturers to collect continuous marketing information and to perform continuous marketing research among its customers. From the use of the system and method of the present invention, valuable information is collected. The collection of consumer commentary may be particularly valuable. For this reason, a store's system may encourage entry of customer commentary, such as in prompting a shopper for his/her comments on a product scanned if the system determines that the shopper has not yet provided comments for that product. It is also possible that the store may offer incentives, such as coupons, discounts, free gifts, etc. for the shopper's contribution(s). It will be further appreciated that the system provides customers with a sense of community as the customers are permitted to share opinions about the items he/she purchases.

It will further be appreciated that the means of bi-directional communication between computer 20 and the hand-held devices is accomplished by means well known in the art. If wireless communication means are used, the hand-held devices and computer 20 must each comprise a transmitter and a receiver for transmission and receipt of information as described herein.

It will be yet further appreciated that the hand-held device is generally an operable computing and communication device. It is possible that the device may actually be owned by the shopper and work with a media device provided by the store at the place of business. For example, the store may provide the shopper with a Compact Flash (™) modem card or wireless phone connector card customized for the store which is plugged into or otherwise connected with the shopper's own personal digital assistant (PDA) to achieve the desired interface and functionality with the processor used by the store, while permitting the shopper to be linked to his/her own personal databases or other information residing on or accessible from the shopper's (PDA).

It will also be appreciated that the shopper's shopping list may be accessible from the hand-held device. The shoppers own PDA may have the list stored thereon or accessible from the PDA. The hand-held device could also retrieve the list from the shopper's own personal computer by means well known in the art. Further, the shopper could enter the list at the hand-held device.

It will be still further appreciated that the system and method of the present invention provide an informative system and method for use in everyday consumer transactions that provide the consumer with qualitative, useful information about the products he/she is interested in consuming.

Referring now to FIG. 9, there is shown a second embodiment of the shopping assistant system according to the present invention. The embodiment of FIG. 9 is used to either locate the position of the consumer in the store, or to identify and communicate a product's location in the store to the consumer. The system of FIG. 9 is comprised of essentially the same elements as the embodiment of FIG. 7, but includes database 24 rather than database 22.

Database 24 contains, for products sold in the store, the Universal Product Code ("UPC") number used as an index, and geometric information corresponding to each product's location in the store. Specifically, the geometric information consists of a set of planogram files containing the spatial coordinates of each product (or shop-keeping unit) located on a shelf fixtures, and a store layout file containing the coordinates of each shelf fixture in the store.

It will be appreciated by those of skill in the art that the use of both the planogram files and the store layout file in database 24 is advantageous over the use of a single file identifying the actual spatial coordinates of the products. Use of the two file approach is reflection of the fact that the store layout is usually stagnant, or, if changed, is not changed with great frequency. Placement of products on the shelves does, however, change with greater frequency. Notwithstanding the advantage of the two file approach to geometric information, a single file containing spatial coordinates may be used and is contemplated to be within the scope of the invention.

To permit a consumer to identify his/her current location in the store using the system of FIG. 9, in one embodiment, the consumer first enters the UPC number from a product's package, hang tag, or shelf tag into a hand-held device of the system. The hand-held device may be the device of FIG. 8, or may comprise a handheld computer, cellular telephone, personal digital assistant, or other hand-held or operable computing or communications device capable of communication (via the appropriate connector 15, 16, 17 or 18) to computer 20. Alternatively, the hand-held device may comprise a device attached to the shopping cart or basket used by the consumer.

The UPC number may be entered by a variety of data entry means, including but not limited to electronic scanning of the UPC number using a laser or video scanner, manual entry of the UPC number using a key board or writing template (such as is found on a Palm Pilot (™), for example), selecting the product from a list of alternatives displayed on a screen of the hand-held device, or by voice recognition whereby the consumer speaks the UPC number to the hand-held device.

The UPC number entered by the consumer is transmitted to computer 20 via connector 15, 16, 17 or 18 and by computer connector 19. Computer 20 then searches database 24 for the geometric data of the product location of that product using the UPC number as the index to database 24. The location of the product is then communicated to the consumer. Specifically, the planogram file information is sent by computer 20 via computer connector 19 and the appropriate connector 15, 16, 17, or 18 to the hand-held device in the proximity of the consumer. The geometric information is conveyed to the consumer by the hand-held device as text, sound, maps, etc. Either computer 20 of the hand-held device may convert the planogram file to the form of information understood by the computer.

It will be appreciated by those of skill in the art that if the consumer's location is known by the system, such as by scanning of a UPC number on a product, by entry of text indicating the current location, by verbal statement of current location, by pinpointing the shopper's location by global positioning system means or other electronic positioning means, or other means well known in the art, the system of the present invention is capable of providing the consumer with directions to the product to be located. Programs well known in the art are utilized to determine the appropriate path between the current position of the consumer and the location of the desired product. If a product is located in several locations in the store, such as on the shelf and in a special display, such a program may utilize a relational approach to determine the location nearest such location. Questions could also be asked by the system to determine the shopper's present location.

It may not always be practical for the consumer to enter the UPC number of a product. Thus, the system is able to receive other forms of a product identifier, such as the product name, to locate the product. During operation, the consumer uses the entry means to enter the product identifier. Computer 20 then looks at a look-up table to identify the UPC number of the product and then searches for the planogram file as previously described. Alternatively, database 24 could contain product identifier information for either correlation with the UPC number index or for use as an index to database 24.

It will be appreciated by those of skill in the art that, if the shopper's shopping list resides on or is accessible from the hand-held device as previously described, the requested product(s) could be entered automatically from the hand-held device or by selection of a product from the list by the shopper at the hand-held device. Also, the list could be compared by the hand-held device or processor to special deals, such as coupons and rebates and alert the shopper by the communicating means of the hand-held device of such special deals. Alternatively, even if the shopper has not requested a product subject to a special deal, the shopper could be informed of such a special deal.

It will be still further appreciated that the shopper's list or lists may be based on geographical location of one or more stores. For example, the shopper may have different lists for different stores. The system of the present invention is capable of discerning such different lists. By means well known in the art, such as by database identifiers or indices, the identification of the store for which the list is to be obtained may be determined by data entry, retrieval from the processor or system, or by global positioning system means, for example.

It will also be appreciated that various means exist for conveying location and/or direction information to the consumer. For example, a picture of the product could be displayed at the hand-held device if such pictorial information is accessible to computer 20 or otherwise available to the hand-held device. A map may be displayed. The hand-held device may verbally instruct the consumer (such as "enter aisle 7, walk halfway down the aisle, and the product will be on your left as you face the rear of the store"). All such conveyance means are contemplated to be within the scope of the invention.

It will be further appreciated that the location system and method provides the consumer with valuable, time saving information about the location of products to be purchased. Such information may be particularly useful in large stores. Further, directions from product to product are easily provided while the consumer is in the store among the aisles.

As used herein and in the claims, the term "store" is not limited to a retail store, but encompasses any facility from which purchases can be made by a shopper. Such purchases may be manufacturer to consumer, business to business, wholesale, retail, by club membership, etc., and still be within the scope of the term store. Thus, a "shopper" is simply a person or entity who make purchases, without regard to the type of particular purchase.

We claim:

1. A method for aiding a shopper, comprising the steps of:
   providing a system for aiding a shopper, comprising:
   (i) a portable device having means for entry of a product identifier and means for communicating information to the shopper;
   (ii) a processing means remote to the portable device and in bi-directional communication with the portable device;
   (iii) means for data storage in communication with the processing means, the data storage means having product data thereon, the product data comprising at least one product identifier, and, for each at least one product identifier, geometric data for location of the product identified by the product identifier;
   entering a first product identifier with the entry means of the portable device;
   transmitting the entered first product identifier with the portable device to the processing means;
   retrieving with the processing means the first geometric data for the entered first product identifier from the data storage means, wherein the geometric data of the data storage means comprises shelf-location;
   communicating with the processing means the first retrieved geometric data to the portable device; and
   communicating to the shopper with the communicating means of the portable device the first retrieved geometric data.

2. The method of claim 1, wherein the geometric data of the product data comprises data indicating shelf-location.

3. The method of claim 2, wherein the geometric data of the product data further comprises data indicating placement of shelves in the store.

4. The method of claim 1, wherein the entered product identifier comprises a UPC.

5. The method of claim 4, wherein the entry means comprises a scanner.

6. The method of claim 1, wherein the product identifier comprises product name.

7. The method of claim 1, wherein the entry means comprises an electronic writing pad.

8. The method of claim 1, wherein the entry means comprises a voice recognition subsystem.

9. The method of claim 1, wherein the entered product identifier comprises a product name and wherein the product identifier of the product data comprises a UPC, the method further comprising, prior to the step of retrieving the geometric data, the step of identifying the UPC of the product name.

10. A method for aiding a shopper, comprising the steps of:
    providing a system for aiding a shopper, comprising:
        (i) a portable device having means for entry of a product identifier and means for communicating information to the shopper;
        (ii) a processing means remote to the portable device and in bi-directional communication with the portable device;
        (iii) means for data storage in communication with the processing means, the data storage means having product data thereon, the product data comprising at least one product identifier, and, for each at least one product identifier, geometric data for location of the product identified by the product identifier;
    entering a first product identifier with the entry means of the portable device;
    transmitting the entered first product identifier with the portable device to the processing means;
    retrieving with the processing means the first geometric data for the entered first product identifier from the data storage means;
    communicating with the processing means the first retrieved geometric data to the portable device;
    communicating to the shopper with the communicating means of the portable device the first retrieved geometric data;
    entering a second product identifier with the entry means of the portable device;
    transmitting the entered second product identifier with the portable device to the processing means;
    retrieving with the processing means second geometric data for the entered second product identifier from the data storage means;
    calculating with the processing means the geometric path between the first geometric data and the second geometric data;
    communicating with the processing means to the portable device the recommended geometric path; and
    communicating to the shopper with the communicating means of the portable device the recommended geometric path.

11. The method of claim 10, wherein the geometric data of the product data comprises data indicating shelf-location.

12. The method of claim 11, wherein the geometric data of the product data further comprises data indicating placement of shelves in the store.

13. The method of claim 10, wherein the entered product identifier comprises a UPC.

14. The method of claim 13, wherein the entry means comprises a scanner.

15. The method of claim 10, wherein the product identifier comprises product name.

16. The method of claim 10, wherein the entry means comprises an electronic writing pad.

17. The method of claim 10, wherein the entry means comprises a voice recognition subsystem.

18. The method of claim 10, wherein the entered product identifier comprises a product name and wherein the product identifier of the product data comprises a UPC, the method further comprising, prior to the step of retrieving the geometric data, the step of identifying the UPC of the product name.

19. A system for aiding a shopper, comprising:
    a portable device having means for entry of a product identifier and means for communicating information to the shopper;
    a processing means remote to the portable device and in bi-directional communication with the portable device;
    means for data storage in communication with the processing means, the data storage means having product data thereon, the product data comprising at least two product identifiers, and, for each at least two product identifiers, geometric data for location of the products identified by the product identifiers; and
    means to enable the processing means to calculate the geometric path between a first geometric data and a second geometric data.

20. The method of claim 19, wherein the geometric data of the product data comprises data indicating shelf-location.

21. The method of claim 20, wherein the geometric data of the product data further comprises data indicating placement of shelves in the store.

22. The method of claim 19, wherein the entered product identifier comprises a UPC.

23. The method of claim 22, wherein the entry means comprises a scanner.

24. The method of claim 19, wherein the product identifier comprises product name.

25. The method of claim 19, wherein the entry means comprises an electronic writing pad.

26. The method of claim 19, wherein the entry means comprises a voice recognition subsystem.

* * * * *